(No Model.)   3 Sheets—Sheet 1.

G. F. SIMONDS.
SAW WITH INSERTIBLE TEETH.

No. 326,684.   Patented Sept. 22, 1885.

Witnesses
H. S. Downe
Geo. E. Downe.

Inventor:
Geo. F. Simonds,
by R. K. Evans
Atty.

(No Model.) 3 Sheets—Sheet 2.

G. F. SIMONDS.
SAW WITH INSERTIBLE TEETH.

No. 326,684. Patented Sept. 22, 1885.

WITNESSES
F. D. Ellsworth.
T. C. Brecht.

INVENTOR·
Geo. F. Simonds
by R. K. Evans
By      Attorney (No Model.)  3 Sheets—Sheet 3.

G. F. SIMONDS.
SAW WITH INSERTIBLE TEETH.

No. 326,684.  Patented Sept. 22, 1885.

Witnesses
F. D. Ellsworth
F. C. Brecht

Inventor
Geo. F. Simonds
by R. K. Evans
att'y.

UNITED STATES PATENT OFFICE.

GEORGE F. SIMONDS, OF FITCHBURG, MASSACHUSETTS.

SAW WITH INSERTIBLE TEETH.

SPECIFICATION forming part of Letters Patent No. 326,684, dated September 22, 1885.

Application filed April 22, 1885. (No model.)

*To all whom it may concern:*

Be it known that I, GEORGE F. SIMONDS, of Fitchburg, in the county of Worcester and State of Massachusetts, have invented certain useful Improvements in Inserted-Tooth Saws; and I hereby declare the following to be a full, clear, and exact description thereof, reference being had to the accompanying drawings, making part of this specification, in which—

Figure 1:
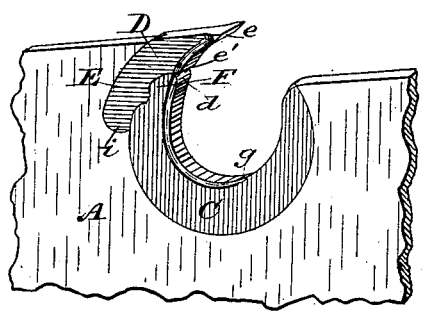
Figure 2:
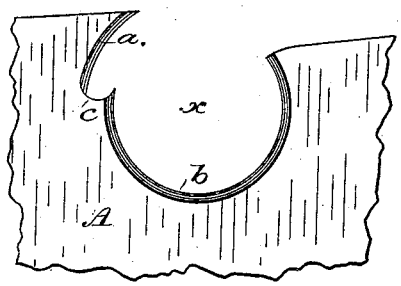
Figure 3:
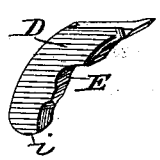
Figure 4:
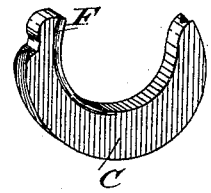
Figure 5:
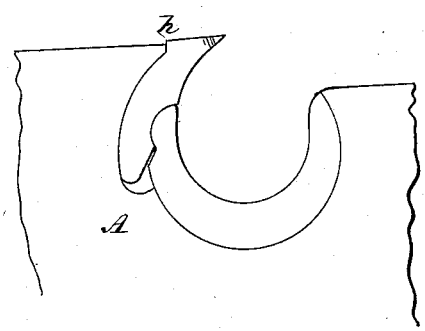
Figure 6:
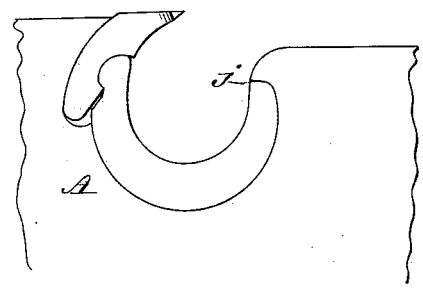
Figure 7:
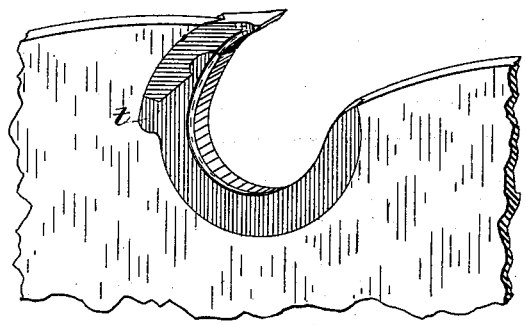
Figure 8:
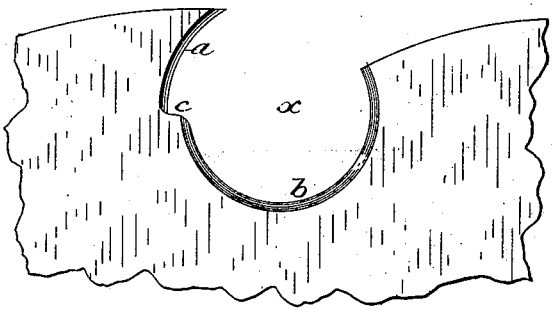

Figure 1 is a perspective view of my improved inserted tooth applied. Fig. 2 is an elevation of a portion of a saw-plate prepared to receive the removable portions. Fig. 3 is a perspective view of the removable cutting-point. Fig. 4 is a perspective view of the removable gullet. Figs. 5 and 6 are modifications of the construction shown in Fig. 1. Figs. 7 to 11, inclusive, show slight modifications of form and lines of the tooth and gullet.

My invention relates to that class of inserted-tooth saws wherein the points of the teeth especially are intended to be replenished, and has for its object, first, to produce an inserted-tooth saw having no holes in the tooth or plate when the saw is set up; second, to produce a saw of a given radius having a greater number of teeth than it has been practicable to have in removable-tooth saws heretofore made.

To this end my invention consists in a saw-plate having a peripheral recess cut in the arcs of two circles of substantially the same center but of different radii, in combination with an insertible gullet and insertible cutting-point, each having its front face swaged wider than the thickness of the saw-plate, and having their rear faces conforming to the outline of the saw-plate recess.

In order that those skilled in the art may make and use my invention, I will proceed to describe the exact manner in which I have carried it out.

In the said drawings, A is a saw-plate provided with recess X, bounded by the arc of circle $a$ and by the arc of a smaller circle, $b$, both arcs being struck from substantially the same center, and also by a curvilinear shoulder, $c$, which connects the approaching ends of the two arcs $a\ b$.

In Fig. 1 is shown the cutting-point D and removable gullet C in position in the saw-plate, beveled grooves on their rear faces fitting the angular edges of the arcs $a\ b$ of the recess. The depression E in the point D and the projection F on the removable gullet are so proportioned and arranged as to lock into each other for the purpose of carrying the point D into position as the gullet is forced around, and retaining it securely while the saw performs its work, the lower end, $i$, of point D bringing up and resting against shoulder $c$ to sustain the thrust of the resistance of the material being cut. The cutting-edge of the point D is swaged or spread to the necessary width to insure a proper clearance to the saw-plate in the kerf. The front faces of the point D between $e$ and $e'$ and of the gullet between $d$ and $g$ are also spread, but not so wide as the spread of the cutting-edge. The spreading of the faces of both is of substantially even thickness throughout and of sufficient width to form with the sides of the kerf a complete pocket for removing the dust from the log.

The modifications illustrated in Figs. 5 and 6 show the plate cut with shoulders $h$ and $j$, either of which can be used in lieu of shoulder $c$; but for various practical reasons the form shown in Fig. 1 will be found to be preferable.

Figure 9:
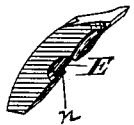
Figure 10:
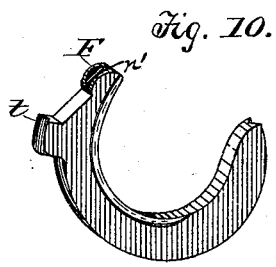

In Figs. 9 and 10 I have particularly illustrated the projection F on the gullet provided with a longitudinal groove, $n'$, and within the depression E in the point is a central longitudinal rib, $n$, designed to lie within the groove $n'$ when the tooth is set and lock together the tooth and gullet at that point, so as to prevent any lateral play.

It will be seen that I avoid at the gullet and point all perforations and irregularities and obtain a continuous sweeping curve from the cutting-edge throughout the gullet, and also am thereby enabled to make the inserted gullet narrower without weakening it, and thereby avoid to a considerable extent working the stock out of the plate. Over the saws of a similar character, with the cutting-point and fastening device on the same circle, I gain from one-quarter to three-eighths of an inch both on the periphery and radii of the saw, which secures the exceedingly important advantage in a given-size saw of the insertion of two or more additional teeth.

The advantages accruing from the avoidance of holes or openings to catch the dust and wear the plate at any point are so obvious that no amplification of them is needed.

Figs. 7 to 10 illustrate a modification of the form of tooth substantially the same shown in Figs. 1 to 6, with the exception that the modification shows the removable gullet provided with a lug, t, the outer surface of which is struck on an arc having the same radius as the larger circle of the recess in the saw-plate, the said lug resting against the face of the larger circle and sustaining the base of the tooth. The gullet being sprung into the recess, the lug t sustains the thrust of the spring of the gullet and keeps it in place until the lug is free from the face of the larger arc a. Therefore the lug t can be moved from the shoulder c up to the top of the curve or arc a, and the tooth removed without wholly removing the gullet.

Figure 11:
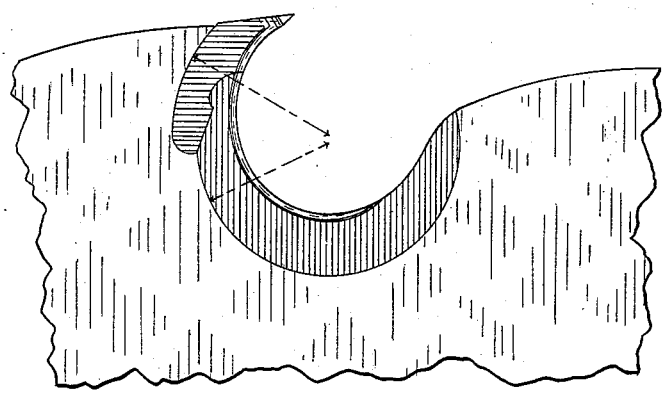

Fig. 11 shows a modification to enable the tooth to enter more easily, wherein the larger circle of the recess in the plate is struck from a center slightly above the center from which the inner circle is struck, yet the centers of the two circles are substantially or about the same. A slight variation in the centers consequently can be made without departing from the spirit of my invention.

Having thus described my invention, what I claim as new, and desire to secure by Letters Patent of the United States, is—

1. The saw-plate provided with recess x, bounded by the arcs of two circles of different radii, and by an intermediate shoulder, in combination with the point D, resting on said shoulder, and also resting for less than ninety degrees against the larger circle, and an inserted gullet resting for more than ninety degrees against the smaller circle, the said point and gullet being provided with interlocking irregularities, substantially as set forth.

2. The removable spring fastening-gullet provided with lug t to abut against the circle having the longer radius for retaining said gullet in place while the tooth is removed, as described.

GEO. F. SIMONDS.

Witnesses:
T. C. BRECHT,
F. D. ELLSWORTH.